(12) United States Patent
Engheta et al.

(10) Patent No.: US 9,952,383 B2
(45) Date of Patent: Apr. 24, 2018

(54) MANIPULATING AND ROUTING OPTICAL SIGNAL NARROW PATHS ON GRAPHENE AND GRAPHENE AS A PLATFORM FOR METAMATERIALS

(75) Inventors: Nader Engheta, Berwyn, PA (US); Ashkan Vakil, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 449 days.

(21) Appl. No.: 13/805,755

(22) PCT Filed: Jun. 8, 2011

(86) PCT No.: PCT/US2011/039620
§ 371 (c)(1),
(2), (4) Date: Mar. 7, 2013

(87) PCT Pub. No.: WO2011/162955
PCT Pub. Date: Dec. 29, 2011

(65) Prior Publication Data
US 2013/0163069 A1    Jun. 27, 2013

Related U.S. Application Data

(60) Provisional application No. 61/357,262, filed on Jun. 22, 2010.

(51) Int. Cl.
*G02B 26/08* (2006.01)
*G02F 1/29* (2006.01)
(Continued)

(52) U.S. Cl.
CPC ............ *G02B 6/1226* (2013.01); *B82Y 20/00* (2013.01); *G02B 5/008* (2013.01); *Y10S 977/734* (2013.01)

(58) Field of Classification Search
CPC .................. H01L 29/15; H01L 29/1606; H01L 23/53276; H05K 3/105; Y10S 977/734; Y10S 977/842; Y10S 977/843

USPC .................. 359/108; 385/122; 257/E21.135, 257/E29.072; 423/448; 977/890; 438/510, 478
See application file for complete search history.

(56) References Cited

U.S. PATENT DOCUMENTS 9,105,793 B2 *  8/2015  Bouchiat ............ G01N 27/4146
2008/0225362 A1 *  9/2008  Covey ......................... 359/108
(Continued)

FOREIGN PATENT DOCUMENTS

WO   WO 2009/0132165 A2   10/2009
WO   WO 2009132165 A2 *   10/2009

OTHER PUBLICATIONS

Feng Wang, Yuanbo Zhang, Chuanshan Tian, Caglar Girit, Alex Zettl, Michael Crommie, Y. Ron Shen. Gate-variable Optical Transitions in Graphene. Science. Apr. 11, 2008 vol. 320.*
(Continued)

*Primary Examiner* — Bumsuk Won
*Assistant Examiner* — Collin X Beatty
(74) *Attorney, Agent, or Firm* — Baker & Hostetler LLP

(57) ABSTRACT

Graphene may support electromagnetic radiation and be able to support a variety of optical devices. In general, graphene may exhibit changeability in properties such as the conductivity and the like of graphene. Graphene may comprise carbon and be of a thickness of a single atomic layer. In another embodiment, Graphene may be thicker than a single atomic layer, but may be able to exhibit changeability in the properties noted above. Disclosed herein is the guiding and manipulating of optical signals on layers of graphene to create waveguides, ribbon waveguides, beamsplitters, lenses, attenuators, mirrors, scatterers, Fourier optics, Luneburg lenses, metamaterials and other optical devices.

26 Claims, 12 Drawing Sheets

(51) Int. Cl.
*G02F 3/00* (2006.01)
*G02B 6/122* (2006.01)
*G02B 5/00* (2006.01)
*B82Y 20/00* (2011.01)

(56) References Cited

U.S. PATENT DOCUMENTS

| | | | |
|---|---|---|---|
| 2009/0291270 A1* | 11/2009 | Zettl et al. | 428/195.1 |
| 2009/0324897 A1* | 12/2009 | Choi et al. | 428/195.1 |
| 2010/0055464 A1 | 3/2010 | Sung | |
| 2010/0092809 A1* | 4/2010 | Drzal et al. | 429/12 |
| 2010/0127312 A1* | 5/2010 | Grebel et al. | 257/288 |
| 2011/0089404 A1* | 4/2011 | Marcus et al. | 257/29 |
| 2011/0186805 A1 | 8/2011 | Bowers et al. | |
| 2011/0186817 A1* | 8/2011 | Bowers et al. | 257/29 |

OTHER PUBLICATIONS

Frank Schiwerz. Graphene Transistors. Nature Nanotechnology, vol. 5, Jul. 2010. Published online May 30, 2010.*

K. S. Novoselov, et al., "Electric Field Effect in Atomically Thin Carbon Films", Science, 306, 666 (2004).

K. S. Novoselov, et al., "Two-dimensional gas of massless Dirac fermions" Nature (London) 438; 197 (2005).

G. W. Hanson, "Quasi-transverse electromagnetic modes supported by a graphene parallel-plate waveguide," Journal of Applied Physics, 104,084314 (2008).

G. W. Hanson, "Dyadic Green's functions and guided surface waves for a surface conductivity model of graphene," Journal of Applied Physics, 103, 064302 (2008).

S. A. Mikhailov and K, Ziegler, "New electromagnetic mode in graphene", Physical Review Letters, 99, 016803 (2007).

M. Jablan, et al., "Plasmonic in graphene at infrared frequencies," Physical Review B, 80, 245435 (2009).

V. P. Gusynin, et al., "Magneto-optical conductivity in graphene", J. Phys.: Condens. Matter, vol. 19, 026222 (2007).

A. Alu and N. Engheta, "Optical nano-transmission lines: Synthesis of planar lefthanded metamaterials in the infrared and visible regimes," Journal of Optical Society of America B, special issue on Metamaterials, vol. 23, No. 3, pp. 571-583, Mar. 2006.

* cited by examiner

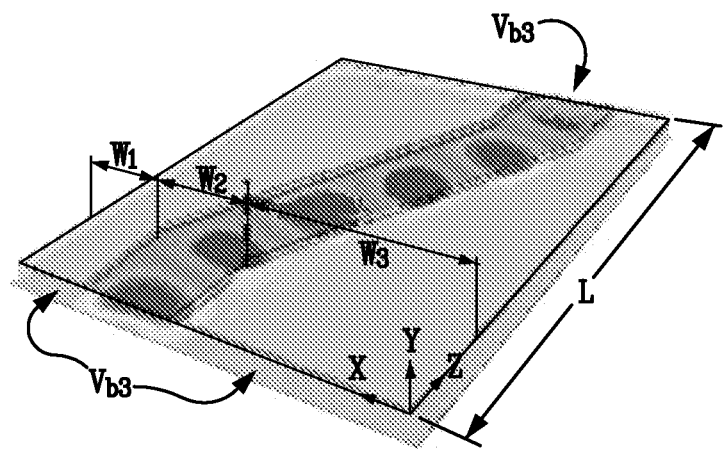
FIG. 4A
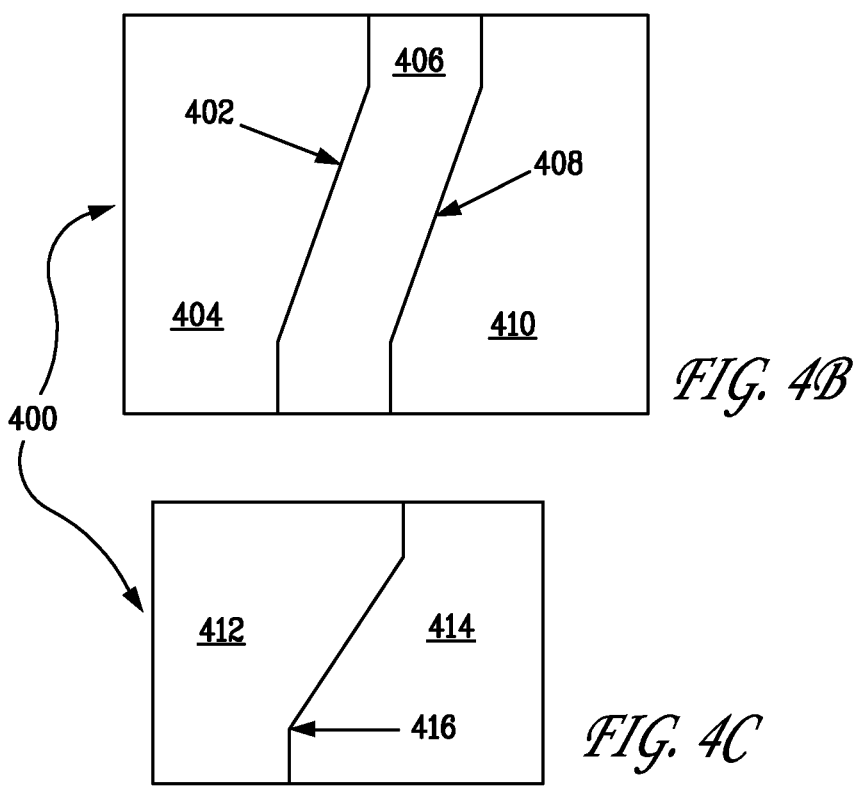
FIG. 4B
FIG. 4C

MANIPULATING AND ROUTING OPTICAL SIGNAL NARROW PATHS ON GRAPHENE AND GRAPHENE AS A PLATFORM FOR METAMATERIALS

CROSS-REFERENCE TO RELATED APPLICATIONS

This application is the National Stage of International Application No. PCT/US2011/039620, filed Jun. 8, 2011, which claims the benefit of U.S. Provisional Application No. 61/357,262 filed Jun. 22, 2010, the disclosures of which are incorporated herein by reference in their entireties for any and all purposes.

STATEMENT OF GOVERNMENT INTEREST

This invention was made with government support under grant numbers FA9550-08-1-0220 and FA9550-10-1-0408 awarded by the United States Air Force Office of Scientific Research (AFOSR). The government has certain rights in the invention.

TECHNICAL FIELD

The following relates generally to the fields of nanotechnology, plasmonics, optics and graphene.

BACKGROUND

Interaction of optical signals with metallic nanostructures and metal surfaces plays an important role in the emerging fields of plasmonics, metal optics, and optical metamaterials. Collective oscillation of conduction electrons in metal due to their interaction with optical signals leads to various exciting features, such as optical field confinement and enhancement, due to the local and surface Plasmon resonances. Plasmonic nanostructures are also the integral parts of building blocks in optical metamaterials with unconventional effective parameter values, such as negative or near zero permittivity, permeability and/or refractive index. The permittivity of most of the noble metals is believed to have a negative real part, which suggests the possibility of new materials having interesting properties associated with it. However nobel metals also exhibit significant ohmic losses, which are represented by the imaginary parts of their permittivity functions. These ohmic losses in part prevent noble metallic nanostructures being used for manipulating optical signals.

Independent of the field of optical signals and metallic nanostructures, some groups have been studying graphene, which is a single atomically thin layer of carbon. Graphene has recently been shown to exhibit interesting conductive properties, one of which is a complex conductivity, $\sigma_g = \sigma_{g,r} + i\sigma_{g,i}$, which depends on radian frequency $\omega$, charged particle scattering rate $\Gamma$ representing loss mechanism, temperature T, and chemical potential $\mu_c$ which depends on the carrier density controllable by a gate voltage and/or chemical doping. An interesting feature of the conductivity of graphene is that its imaginary part, i.e., $\sigma_{g,i}$, can attain both negative and positive values in different ranges of frequency for different gate voltages, different chemical potentials and temperatures.

SUMMARY

It is desirable to create and use interesting optical properties, such as a negative or near zero permittivity, permeability and index noted above with respect to the plasmonic and optical features, while reducing the amount of ohmic loss typically associated with these features. Further, it is desirable to be able to exploit these features to create optical systems and methods in the nanoscale.

Disclosed in an embodiment herein is the guiding of optical signals on, for example, graphene. In one embodiment, a layer of graphene may be configured such that there is an interface between a first portion of graphene having a first conductivity, and a second portion of graphene having a second conductivity. In one embodiment, the difference in the conductivities at the interface may act as a waveguide. As an illustrative example, graphene is a single atomic layer thick, and the interface between two portions of a layer of graphene may be very thin, so the waveguide can be configured as a plane having almost no thickness. Because graphene has a low loss, the guided waves along the interface between the two portions of graphene can be associated with a decrease in ohmic losses.

In an embodiment, the conductivity of the graphene may be tunable in any way, altering both the imaginary and real portions of the conductivity. Further, graphene may be tunable in real time, allowing for the enclosed implementations to change in one or more ways on the fly to adapt to variance in optical signals, desired outputs and the like.

In an embodiment, the waveguide formed by the interface of two portions of a layer of graphene may be configured such that the waveguide is substantially linear.

In another embodiment, the waveguide formed by the interface of two portions of a layer of graphene may be configured such that the waveguide is substantially curved. Further, the waveguide may be configured such that it has a linear portion and a curved portion, one or more angles or turns, or configured in any other manner consistent with the interface.

As another example, a waveguide formed by the interface of two portions of a layer of graphene may further comprise a third portion of the layer of graphene intersecting the interface. This third portion may act as a scatterer, a lens, a Luneburg lens, Fourier optics, a metamaterial, a mirror, an attenuator, a splitter or a combiner. By altering the conductivity along the interface, creating inhomogenieties, gradients and the like, these optics can be configured. Further, tunable optics are possible if control over the configuration of conductivities along an interface. As such, tunable optics are possible.

In another embodiment, the layer of graphene may comprise a third portion of graphene configured as a ribbon. In such an embodiment, the third ribbon portion may act as a bounded area for a waveguide of an electromagnetic signal. In such an embodiment, a first portion of graphene may have a first conductivity, and may have a first interface with the third portion of graphene having a third conductivity. The third portion of graphene may also have a second interface with the second portion of graphene having a second conductivity. Thus the third portion of graphene may be bounded on both sides by portions of graphene having conductivities that are not equal to the third conductivity. Such a geometry on graphene may comprise a ribbon-like waveguide.

In another embodiment, the ribbon waveguide may be linear, or curved or bent or it may have any other geometry associated with a waveguide.

In another embodiment, a fourth portion of graphene having associated therewith, a fourth conductivity may be introduced in the path of the waveguide.

In one embodiment, the fourth portion of graphene may be configured to split the waveguide. In such an embodiment, the interfaces of the first portion, second portion and fourth portion may look like, for example, a Y. As one example, configuring graphene in such a way may act as a beamsplitter or combiner in an atomically thin plane of graphene.

In another embodiment, a ribbon waveguide described above may be configured as a splitter or combiner using a first, second, third and fourth portion of graphene. Thus, in one embodiment a ribbon waveguide beamsplitter may be implemented.

In another embodiment, the fourth portion of graphene may be configured to intersect the interface of the first portion of the layer of graphene and the second portion of the layer of graphene. This intersection may, in one embodiment, be perpendicular to either the interface waveguide or the ribbon waveguide.

In one embodiment, the intersection between the fourth portion of graphene and the waveguide may act as a reflective surface, or, for example, a planar mirror or reflective device. This reflective surface may be perpendicular to the waveguide, or it may be at any angle to the waveguide, thus causing a reflection at any angle between 0 and +/−180 from the intersection point.

In another embodiment, the intersection may have some width, or thickness, or curvature associated there with and may act as a refractive surface, or, as an example, a lens. In such an embodiment, the lens may focus or defocus an optical signal in the plane of the graphene. As another example, a Luneberg lens may be implemented.

In a further embodiment, the effects of the varying conductivities may be applied to the optical signal to create Fourier optics elements. In such an example embodiment, a single atom thick layer of graphene may be used to create a series of Fourier optics elements acting as collimators, decollimators, lenses, both concave and convex and the like in Fourier optic space.

In another embodiment, the intersection and width/thickness of the fourth portion of the graphene may act as an attenuator.

In a further embodiment, the intersection may act as a scattering surface, such as, for example, a planar scattering device.

In another embodiment, one or more of the first portion, second portion, third portion, forth portion or any other portion of the layer of graphene may be configured to have a negative imaginary part of conductivity, or in another embodiment, one or more may have a positive imaginary conductivity. In another embodiment, one or more of the portions may have a conductivity that may be dynamically altered. In a further embodiment, the conductivities may be gradients, or step functions or both. As a further embodiment, the conductivities may be of a single value.

In one embodiment, one or more of the conductivities associated with any portion of the layer of graphene may be configured in the portions by changing the chemical potential. The chemical potential may be changed by, for example, doping the individual portions. In another embodiment, the conductivities may be configured by placing a first charge on the first portion, a second charge on the second portion, a third charge on the third portion, and a fourth charge on the fourth portion. In another embodiment, the conductivities may be configured by temperature variations. In another embodiment, the conductivities may be configured by biasing voltage variations. In a further embodiment, changes in conductivities of the first, second, third and forth portions of the layer of graphene may be configured by surface tension and/or surface shaping.

In another embodiment, the conductivities of the portions of graphene may be represented as a gradient. As one example, the conductivity of graphene for a portion of graphene may be represented as a two dimensional bell curve having a peak in either positive or negative imaginary part of conductivity. As another example, a gradient may be a series of step functions, or a hemisphere, or divot, an ellipse, a slope up with a peak and a slope down, a pyramid, a plateau, a V, a valley, an arbitrary shape or any other three dimensional surface that may represent a change in conductivity over an area.

In one embodiment, gradients or intersections may act as scale lenses in a single plane. In such an embodiment, changes in effective index of graphene associated with the conductivities of the portions of graphene may be configured to focus or defocus, refract, reflect, collimate, or otherwise manipulate electromagnetic radiation.

The gradients of the first, second, third, or any other portion of a layer of graphene may be associated with the topology of another object. For example, if an object were to have a charged surface, and a planar sheet of graphene were to be placed near the surface, changes in the topology of the surface would be associated with gradients of conductivity of portions of the layer of graphene. In such an example, optical guided signals along the graphene may be used as a tomography, thus providing data associated with a tomographic image of a surface.

These gradients in conductivity and therefore index can, in one embodiment be related to electromagnetic radiation associated in one or more ways with the graphene layers.

In another embodiment, gradients in conductivity may be instituted in a layer of graphene. As one example, these may be a series of gradients that manipulate the optical signal, causing changes in the apparent index of refraction, or that otherwise cause effective changes in the propagation of the optical signal. As such, the graphene may act as an adaptable metamaterial. For example, varying the number, shape, size and conductivities of features in a layer of graphene as described above allows a high degree of control over the optical signal. As such, optical metamaterials may be created that are adaptable for a particular optical signal, and/or a particular metamaterial effect. In an embodiment, metamaterials may be implemented in a ribbon layer of graphene, however, in another embodiment, metamaterials may be implemented along a interface of the graphene, or even on a sheet of graphene. In such examples, inhomogeneitites in conductivity that are smaller than the wavelength of the wave propagating along the waveguide or sheet of graphene can alter the macroscopic behavior of the wave. As one example, varying the size, number and type of inhomogeneities on a graphene waveguide may lead to various metamaterial properties.

BRIEF DESCRIPTION OF THE DRAWINGS

FIGS. 4(a)-(c) depict a bent interface and a bent ribbon, each of which may act as a waveguide for an electromagnetic signal.

FIGS. 6(a)-(b) depict a further geometry available on a layer of graphene, which may act in many ways, for example as an attenuator, a refractor, a scattering surface, a reflective surface, a diffraction surface or the like.

DETAILED DESCRIPTION OF ILLUSTRATIVE EMBODIMENTS

Figure 1A:
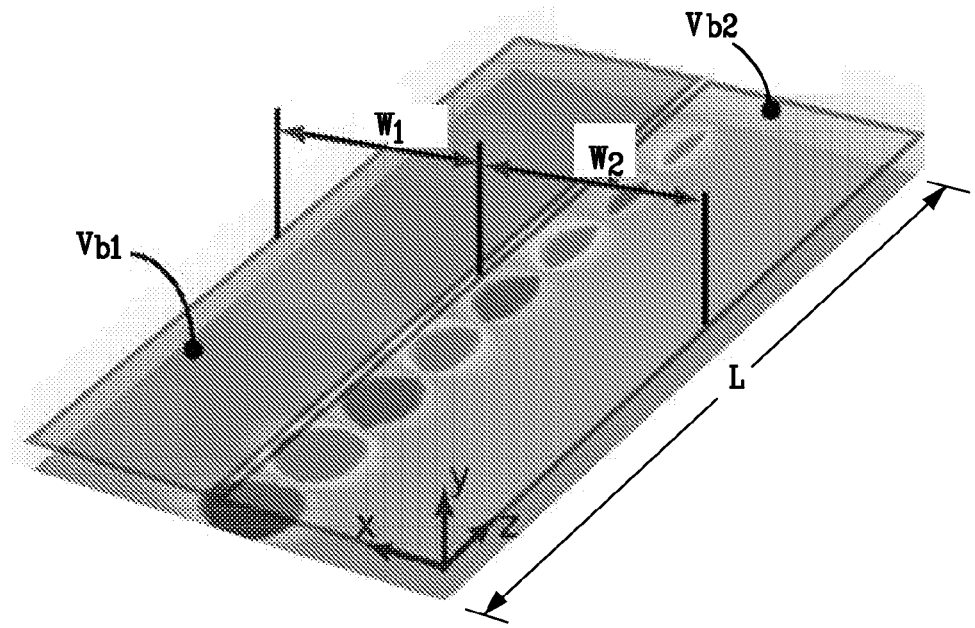
FIGS. 1(a)-(b) depict a linear interface that can behave as a waveguide in a layer of graphene.

In an embodiment, graphene may support electromagnetic radiation and can support a variety of optical devices. In general, graphene may exhibit changeability in conductivity. Graphene may comprise carbon and be of a thickness of a single atomic layer. In another embodiment, graphene may be thicker than a single atomic layer, but can exhibit changeability in the properties noted above. It should be noted that while portions of the specification discuss conductivity exclusively, one having skill in the art will understand that other properties of graphene may be changed and thus may be used in similar manners and configurations to those described herein.

A layer of graphene may be created in any manner known in the art. As a first example, a layer of graphene may be created using wet chemistry, molecular beam epitaxy, etching, vacuum deposition, exfoliation, other deposition methods or any other methods known in the art. In addition, layers of material associated with graphene that support graphene, or that influence the conductivity and other properties may be created by any of the methods above. For example, graphene may be associated with one or more base layers or electrodes. The base layers, electrodes and the like may be created by any of the methods known in the art, including those recited above.

The graphene for a particular device may be configured such that it exhibits desirable properties related to, for example, conductivity or any other variable characteristic of graphene. In one embodiment, configuring graphene may comprise changing the chemical potential of graphene. The chemical potential of graphene may be changed by any means known in the art, such as, for example, doping of graphene. As a first example, graphene may be doped such that there is a decrease in the conductivity of graphene. As another example, doping may cause graphene to have a negative or positive imaginary conductivity. In a further example, graphene may be doped such that the conductivity increases.

Dopants used in altering the chemical potential of graphene may be any dopant known in the art, such as, for example, any metallic material, any conductor, any semiconductor or any insulating material.

In another embodiment, graphene may be configured using an electrical field or charge on or near the graphene. For example, if a surface associated with an electrical charge is placed near a layer of graphene, the electrical field may cause one or more of the properties of graphene to shift. For example, a plate with a charge on it may be placed in a range of from about 1 nm to about 1 cm. An Electric field from the plate may alter or shift one or more properties of graphene.

As a further example, a flat surface with an electrical charge may be placed at a short distance parallel and planar to the graphene. This may subject the portion of the graphene near the surface with an electric field. The electric field may configure one or more properties of the layer of graphene.

Further still, multiple plates having independent charges may be associated with different portions of graphene. In such an embodiment, each portion of the charged surface may be associated with a portion of the graphene and may influence each portion of the graphene in a single layer in different manners. These portions of graphene may have different properties, and these properties may have interfaces between them.

As one example, two plates, each having a different charge may be placed near a layer of graphene. Electric fields from each plate may cause portions of graphene to configure characteristics, such as, for example, conductivity. The interfaces between these areas of the graphene with changed properties may be used in one or more ways.

In another embodiment, more than two charged plates may associate an electric field with portions of graphene. As such, interesting structures may be configured in a layer of graphene, which may be used to create one or more optical elements. As a further embodiment, the charge may be changed dynamically, thus changing conductivity and the like over time as desired by a user controlling the charge on the plates. This change in charge and properties of graphene may be used in any manner.

Figure 10:
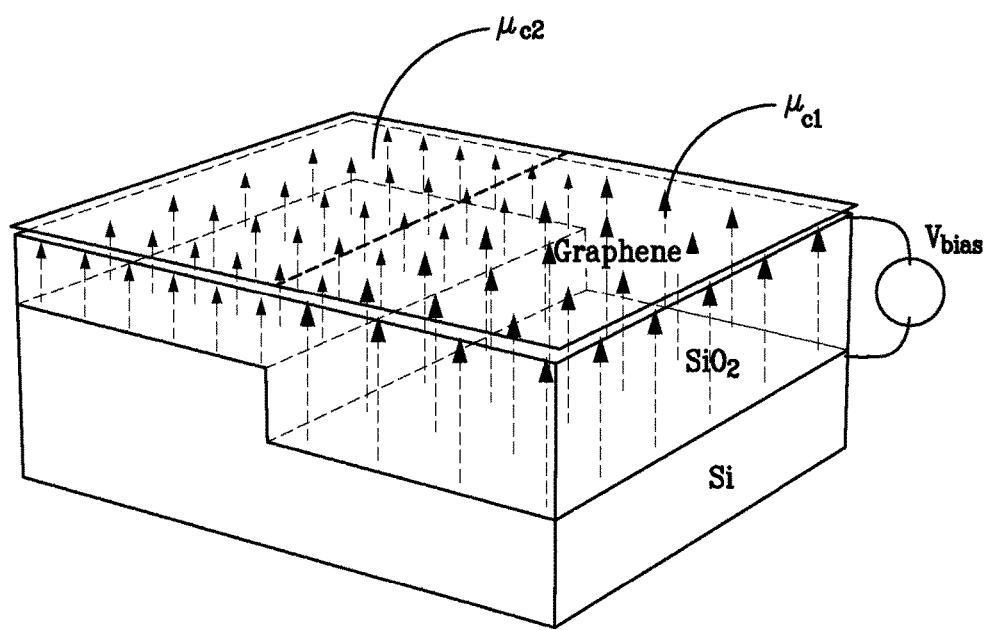
FIG. 10 depicts altering the conductivity in a layer of graphene to create graphene waveguides, lenses, splitters, mirrors, metamaterials, scatters, attenuators, combiners, Luneberg lenses and Fourier optics.
Figure 11:
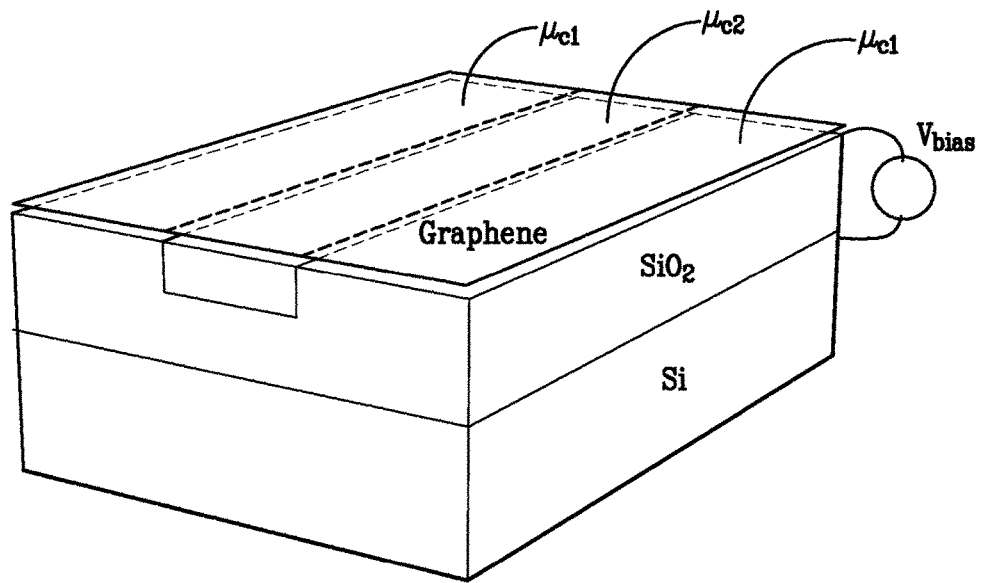
FIG. 11 depicts an additional way of altering the conductivity in a layer of graphene to create graphene waveguides, lenses, splitters, mirrors, metamaterials, luneberg lenses, scatters, attenuators, combiners, and Fourier optics.

In another embodiment, such as depicted in FIGS. 10 and 11, a single charged plate may be placed near to, or touching graphene. In one embodiment, the single charged plate may have associated therewith, a topology. In one embodiment, one or more layers of one or more materials may be placed in between the charged layer and the graphene. These layers may be of a single material, or it may be of varying materials. The variance in topology and/or the topology or material of the intervening layer/layers of material may cause the graphene to have varying conductivities, and accordingly, it can shape the waveguide, lenses, scatters, attenuators, Luneberg lenses, ribbons, splitters, Fourier optics, and metamaterials.

In another embodiment, varying the sign of the imaginary part of the conductivity may cause a bounding effect on an optical signal on a layer of graphene. As such, any of the proposed implementations of changing conductivity may be configured by bounding optical signals with the imaginary part of the conductivity. As one non limiting example, this may comprise a difference in the actual implementation, however, it may have little effect on the result of an optical signal propagating on a layer of graphene.

In another embodiment, electrical connections may be associated with the layer of graphene and may place or remove charges on or from the graphene. These connections may comprise any conductor or semiconductor known in the art that may be used to provide a charge to the layer of graphene.

The properties of graphene may also be configure by changes in temperature and by surface tension or stress. Other means of influencing the properties of graphene may also be available. Graphene may be influenced by any means known in the art to implement the devices, systems and methods disclosed herein.

As used herein, optical signals, surface plasmon polaritons and electromagnetic radiation have been used interchangeably. These signals, plasmons and radiation may be of any frequency in the ultraviolet, visible, infrared, TeraHertz, millimeterwave, and microwave.

In one embodiment, graphene may be configured by one or more of chemical potential, charge and temperature to create an interface wave guide. In such an embodiment, an interface between two portions of graphene may have two different conductivities that provide a waveguide for an optical signal.

Figure 1B:
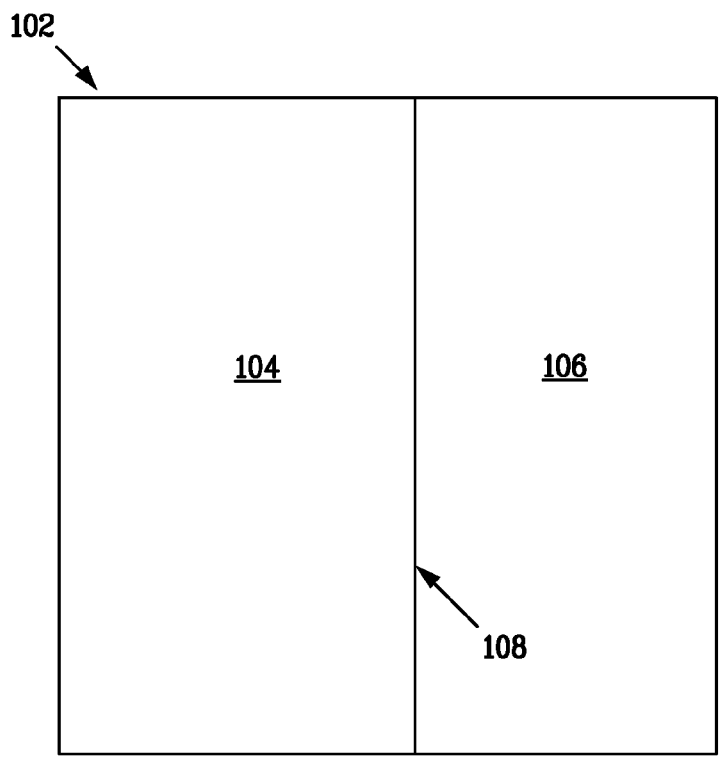

FIGS. 1(a)-(b) depict a layer of graphene 102 having two distinct areas 104 and 106. In FIG. 1(b) the two areas can have different properties, which may be any property noted above. As noted above, these changes in properties may be due to influences by one or more of chemical potential, doping, electric field, charge, temperature and the like. As shown in FIGS. 1(a)-(b), an interface between the two areas 104 and 106 of the layer of graphene 102 may have an interface 108. This interface may, in one embodiment, be used as a waveguide for an optical signal.

Figure 2A:
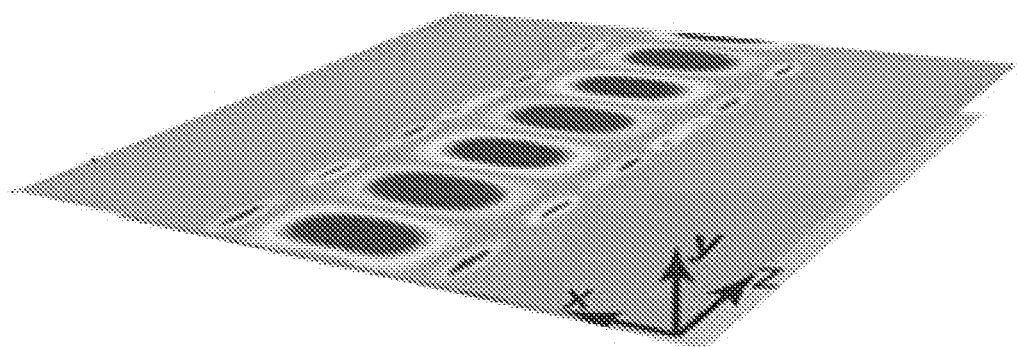
FIGS. 2(a)-(b) depict a linear ribbon in a layer of graphene where the center portion may act as a waveguide bounding an electromagnetic signal.
Figure 2B:
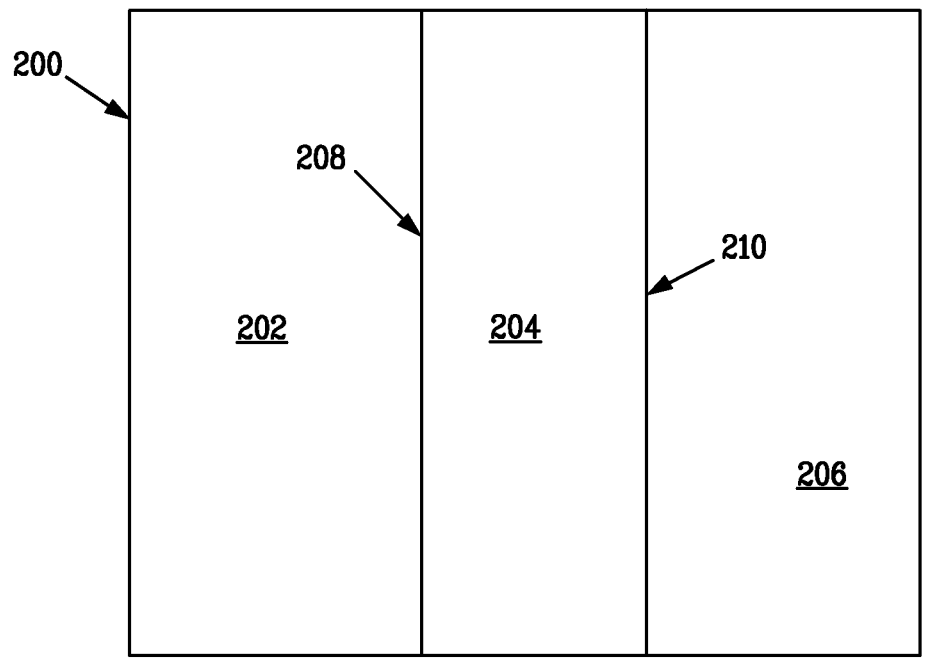

FIGS. 2(a)-(b), depict a layer of graphene 200 that may be configured as a ribbon. Three areas of graphene, 202, 204 and 206 may have associated therewith, distinct values for conductivity and the like. Thus, the central portion 204 of the layer of graphene 200 may have a value of, for example, conductivity that is bounded by two regions 202 and 206 having different conductivities. In such an embodiment, this may create a ribbon waveguide. As one example, the conductivities of 202 and 206 are the same, while in another they are different. These conductivities may be introduced in any manner described above, such as, for example, by changing the chemical potential, placing an electric charge on the graphene, biasing voltage, temperature and the like.

Figure 3A:
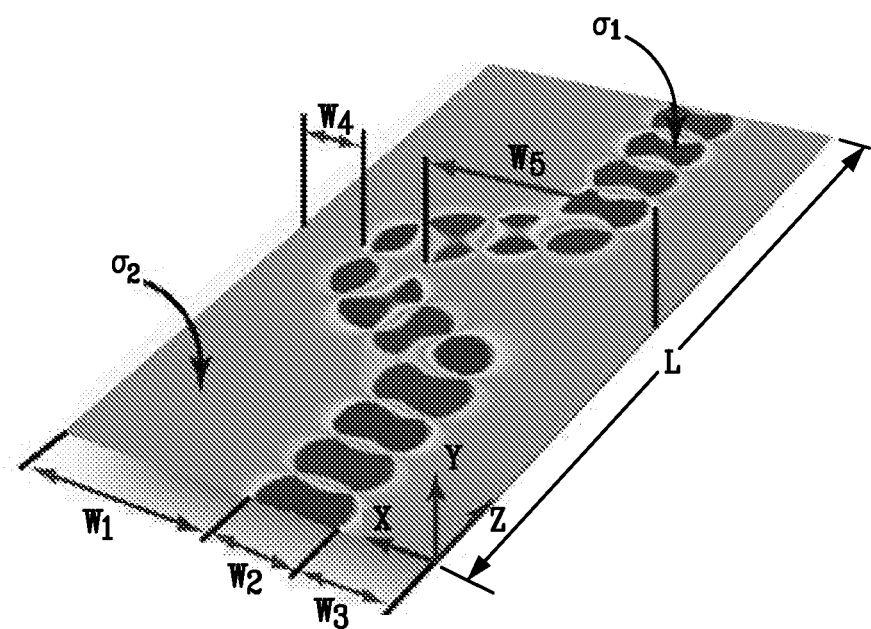
FIGS. 3(a)-(c) depict a curved interface and a curved ribbon, each of which may act as a waveguide for an electromagnetic signal.
Figure 3B:
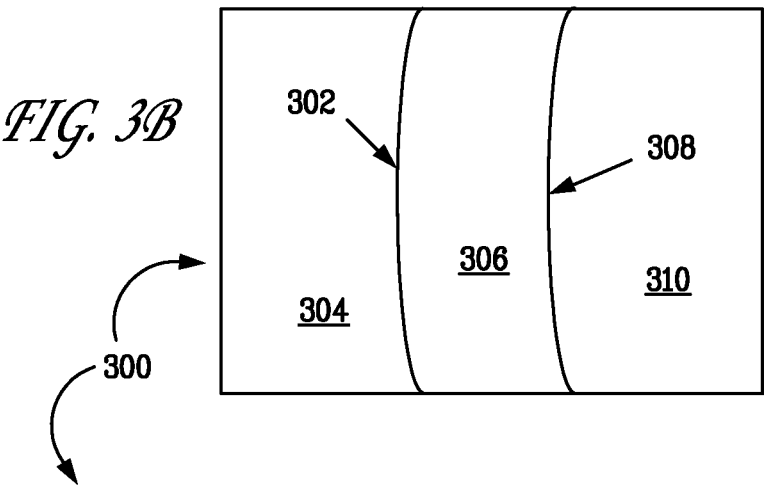
Figure 3C:
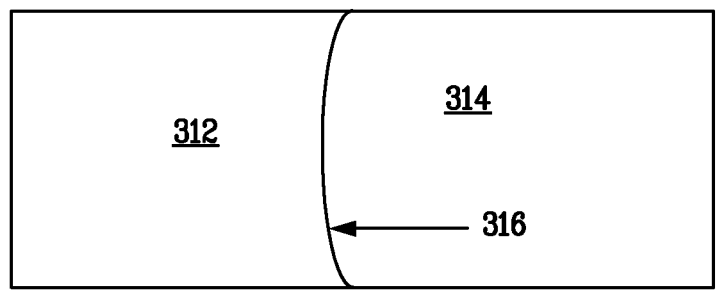

FIGS. 3(a)-(c) depict curved waveguides. As one example, a curved waveguide may be a curved ribbon waveguide. As another example, the curved waveguide may be an interface waveguide. A curved waveguide device may be implemented on a layer of graphene 300. In FIG. 3(b), a ribbon portion 306 of graphene bounded by two other portions of graphene 304 and 310, and the ribbon portion 306 may be implement as a waveguide where interfaces 302 and 308 are created by differences in one or more values associated with graphene, such as, for example conductivity. The bounded area 306 may act as a ribbon waveguide for electromagnetic radiation. In one embodiment, 304 and 310 have equal conductivities and the like. In another embodiment, they are different. Area 306 can have values for one or more of conductivity, and the like that are different from the areas 304 and 310. These values may be associated with the areas of graphene in any of the ways described above, such as, for example, chemical potential, charge, biasing voltage, temperature and the like.

FIG. 3(c) depicts two portions of graphene 312 and 314, each having different values of, for example, conductivity. The interface between the two 316 may act as a waveguide for electromagnetic radiation.

FIGS. 4(a)-(c) depict waveguides with substantially linear and bent portions. As one example, a waveguide may be a bent ribbon waveguide. As another example, the waveguide may be a bent interface waveguide. A bent waveguide device may be implemented on a layer of graphene 400. In FIG. 4(b), a ribbon portion 406 of graphene bounded by two other portions of graphene 404 and 410, and the ribbon portion 406 may be implement as a wave guide where interfaces 402 and 408 are created by differences in one or more values associated with graphene, such as, for example, conductivity. The bounded area 406 may act as a ribbon waveguide for electromagnetic radiation. In one embodiment, 404 and 410 have equal conductivities and the like. In another embodiment, they are different. Regardless, area 406 will have values for one or more of conductivity and the like that are different from the areas 404 and 410. These values may be associated with the areas of graphene in any of the ways described above, such as, for example, chemical potential, charge, biasing voltage, temperature and the like.

FIG. 4(c) depicts two portions of graphene 412 and 414, each having different values of, for example, conductivity. The interface between the two 416 may act as a waveguide for electromagnetic radiation.

Figure 5A:
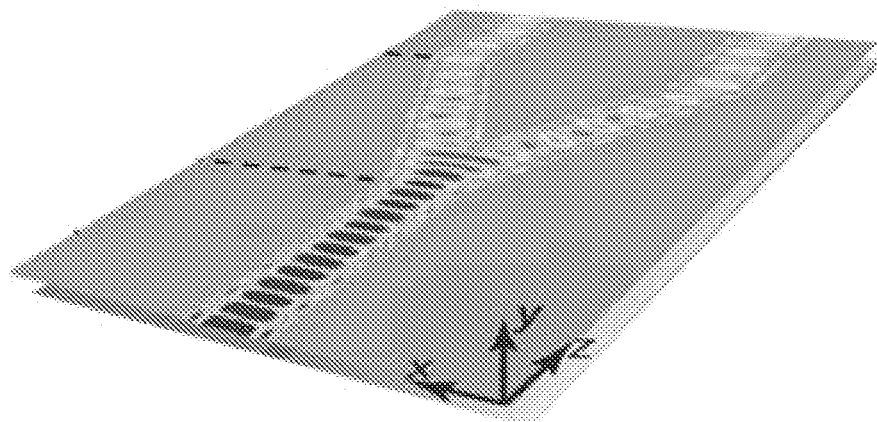
FIGS. 5(a)-(c) depict an electromagnetic splitter or beam-splitter, both along a single interface and as a ribbon.
Figure 5B:
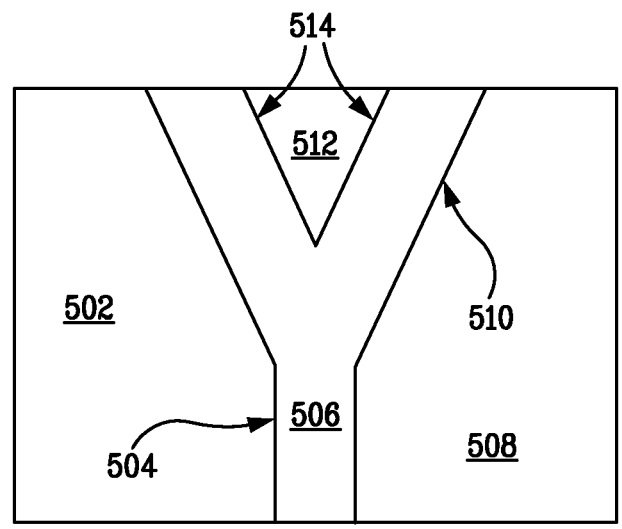
Figure 5C:
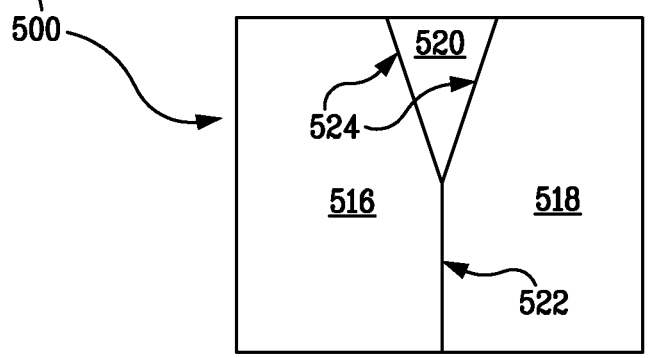

FIGS. 5(a)-(c) depict splitters and/or combiners implemented on a layer of graphene 500. These planar, splitters may be implemented on a layer of graphene 500 having one or more ribbon waveguides, or one or more interfaces. As shown in FIG. 5(b), a bounded ribbon portion 506 of graphene may be bounded by three other areas of graphene 502, 508, and 512. Each portion of graphene may have a different conductivity. Or, in another embodiment, the bounded portion 506 has a conductivity that is different from graphene portions 502, 508, and 512, which all have the same conductivity. The various portions of the graphene layer 500 may set up interfaces 504, 510, and 514 which may act as a waveguide.

While it is envisioned that the ribbon of graphene in FIG. 5(b) may act as a beamsplitter, is should also be noted that the ribbon portion may act as a combiner, where two optical signals are traveling, one down each arm of the Y and funneling into the base.

FIG. 5(c) depicts another embodiment of a splitter or combiner where the waveguides are interfaces and not ribbon portions. In such an embodiment, three portions of graphene 516, 518, and 520 will have different conductivities and the like and interfaces 522 and 524 may be established between each portion 516, 518, and 520. Thus, an optical signal that travels down the waveguide may be split, or two optical signals traveling from top to bottom may be combined.

Figure 6A:
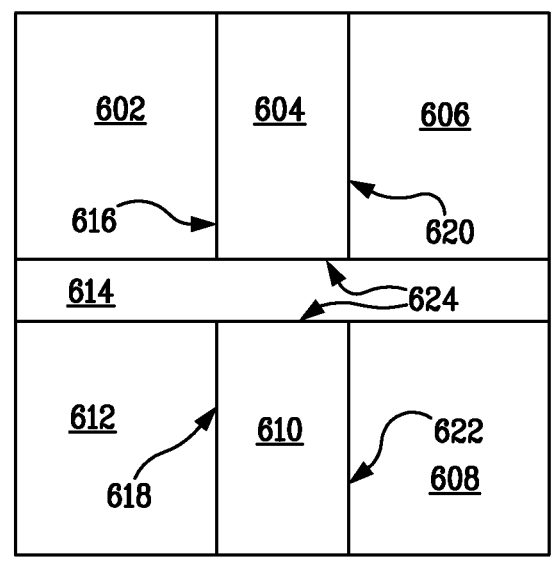
Figure 6B:
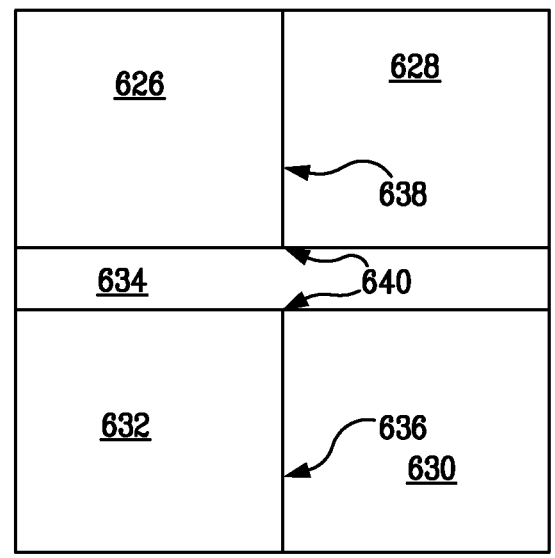

FIGS. 6(a)-(b) depict planar lenses, attenuators and/or scattering geometries. As depicted, in FIG. 6(a), a layer of graphene 600 with a ribbon waveguide may have 7 portions of the graphene, 602, 604, 606, 608, 610, 612, and, 614, each having associated therewith a conductivity and the like. In one embodiment, each portion has a distinct conductivity. In another embodiment, two or more may have the same conductivity, and as a further example, two or more groups may contain portion of the layer of graphene where each has the same conductivity. Regardless, the geometry of the portions of graphene may be such that the intersecting portion 614 in FIG. 6(a) intersecting the ribbon portions 604 and 610 may act as an attenuator, a scattering surface, a focusing portion or a defocusing portion. How intersecting portion 614 effects electromagnetic radiation in ribbon portions 604 and 610 may depend on the width/thickness of the intersecting portion 614, the index of 614, the conductivity of 614, or any other property of intersecting portion 614 in comparison to the other portions 602, 604, 608, 612, 604, and 610. The property of each portion may be instituted in each portion in any manner described above. The differences between each portion may set up interfaces 616, 618, 620, 622, and 624. These interfaces may act as the boundaries of the waveguide, the boundaries of the intersecting portion and in any other manner known in the art. The interfaces, while depicted as straight lines in FIG. 6(*a*), may be gradients, or they may be gradually reducing or increasing in conductivity. These interfaces may be curved or angled in any fashion. While the intersecting portion is shown perpendicular to the ribbon and interface, it should be understood that this intersecting portion may be at any angle with respect to the interface or ribbon, thus causing scatter, focus, defocus or attenuation in any direction in the plane of the graphene.

FIG. 6(*b*), similar to FIG. 6(*a*) depicts an intersecting layer 634 to interfaces 638 and 636, where the interfaces created by differences between portions of graphene 626, 628, 630, and 632 act as a waveguide for an optical signal. The intersecting layer may create additional interfaces 640, which may refract, scatter, attenuate, bend, focus or otherwise manipulate the optical radiation wave guided in the plane of graphene on the interfaces 636 and 638.

Figure 7A:
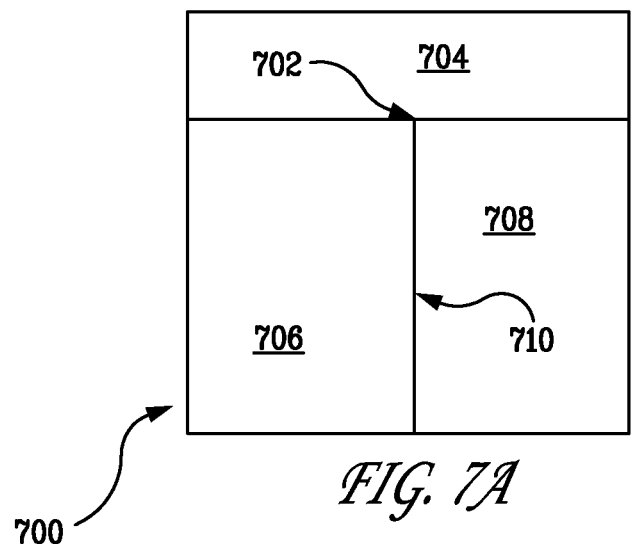
FIGS. 7(a)-(b) depict a further geometry available on a layer of graphene.
Figure 7B:
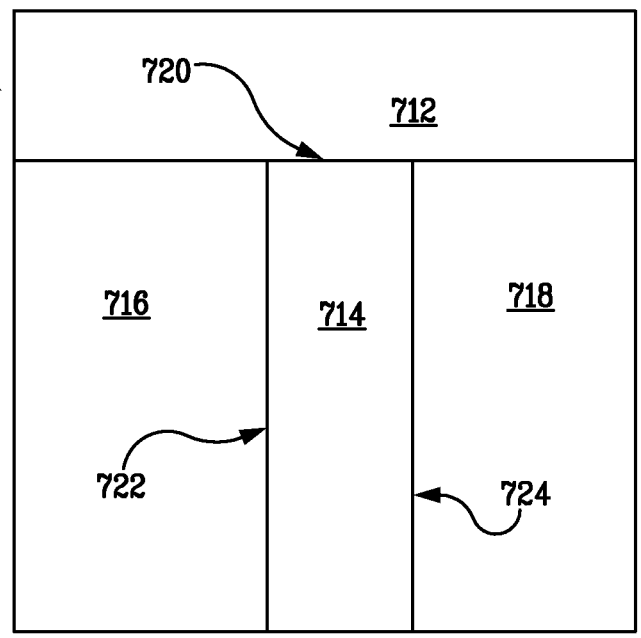

FIGS. 7(*a*)-(*b*) depict ribbon and interface waveguides on a layer of graphene 700 configured to have an intersection portion 704 for FIGS. 7(*a*) and 712 for FIG. 7(*b*) such that an optical signal may be reflected. In FIG. 7(*a*) an interface 710 is established by having two portions 706 and 708 of the layer of graphene 700, each portion having a conductivity associated therewith. The interface may lead to an intersecting layer, 704, where the intersecting layer has a third set of properties associated therewith. While FIG. 7 shows the intersection as perpendicular, one having skill in the art would understand that there may well be an angle to the intersection to create total internal reflection. In addition, while the reflection depicted a reflection at 90 degrees, it should be understood that such a reflection may be at any angle between the interface 710 and the intersecting layer 704. Thus, optical signals may be reflected in any direction from 0 to 180 degrees from its incoming angle.

FIG. 7(*b*) depicts a ribbon portion 714 having an intersection with an intersecting portion 712, where the interface between the two 720 causes a reflection. The ribbon portion, as noted above may be created by portions of the layer of graphene 714, 716, and 718. The reflection may be caused by differences in properties associated with the various portions of graphene 712, 714, 716, and 718. While the intersecting portion shown herein is perpendicular to the ribbon portion, it should be understood that the intersecting portion may be at any angle with respect to the ribbon portion, thus causing a reflection in any direction. Further, it is understood that when the term intersection is used, it means that it can cut across the entire ribbon portion, it can be implemented entirely inside the ribbon portion, or it can be partially inside and partially outside of the ribbon portion. As such, intersection is defined broadly and is not intended to limit the location in which a signal interacts with it, it is merely intended to show that a signal may interact with the intersecting portion under the right conditions.

Figure 8A:
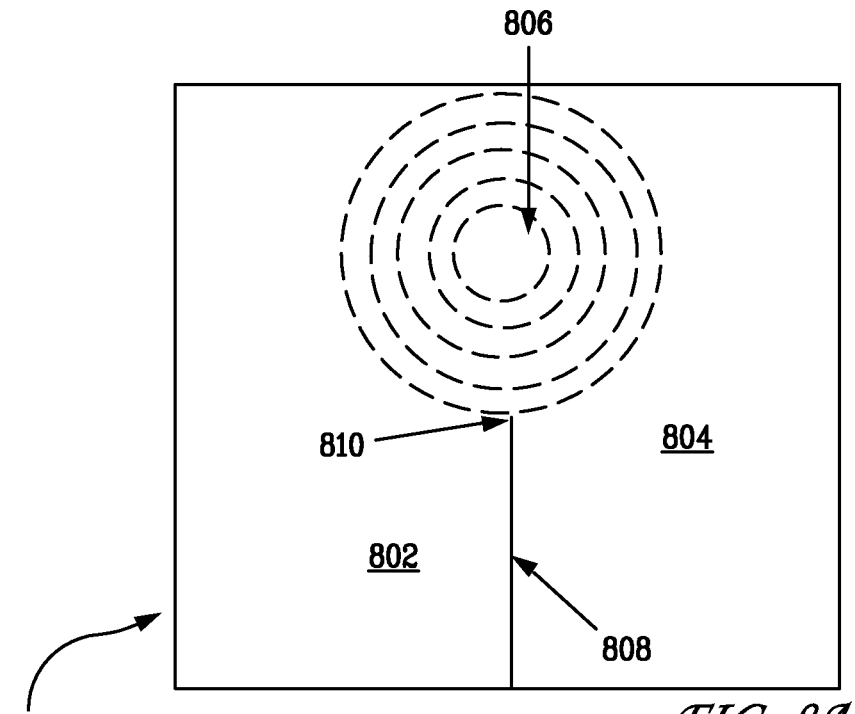
FIGS. 8(a)-(b) depict a further geometry with a gradient permittivity in a layer of graphene.
Figure 8B:
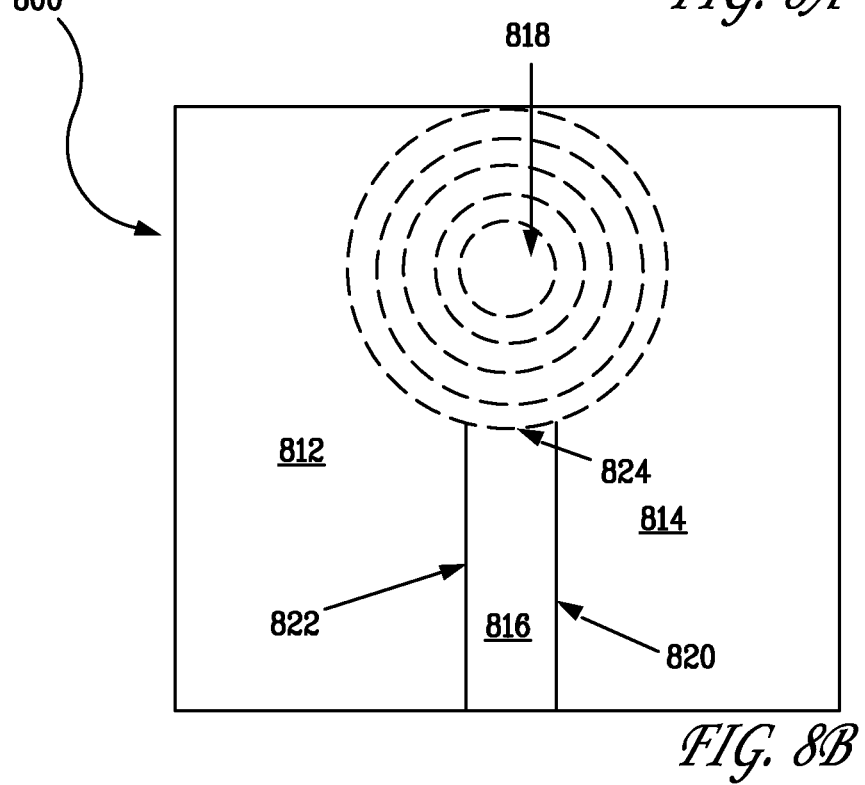

FIGS. 8(*a*)-(*b*) depict a ribbon waveguide and an interface waveguide interacting with a portion of a graphene layer having a gradient of conductivity. As shown in FIG. 8(*a*), an interface 808 between two portions 802, 804 of a layer of graphene 800 may interact with a portion of graphene 806 having associated there with, a gradient.

In one embodiment, the gradient may be a dome, or hemisphere as of either positive or negative value as depicted in FIG. 8(*a*). In addition, the gradient may be of any height, depth and shape, for example, it may be an ellipse, a dimple, a bump, a square, a pyramid, a series of step functions, rectangular, amorphous, bell shaped or any other gradient known in the art. This gradient may be a gradient in the conductivity or any other value associated with graphene. These gradients may be implemented in graphene in any manner described above, including from an electric field on a surface near the graphene, chemical potential, or any other means known in the art.

In one embodiment, the gradient may serve to focus or defocus optical signals on the waveguide. In another embodiment, the gradient portion may act to reflect, attenuate, scatter or otherwise manipulate an optical signal.

Similar to FIG. 8(*a*), 8(*b*) depicts a waveguide interacting with a gradient portion 818 of graphene. The ribbon portion 816 may have an interface 824 with the gradient portion. As noted above, the gradient may be a gradient in conductivity or of any other property associated with graphene. In addition, this gradient may be of any size, depth and shape. For example, the gradient may be a wave, an ellipse, a circle, a hemisphere, a dot, a divot, a pyramid or triangle, a square or rectangle, a series of step functions, amorphous or any other shape known in the art.

In one embodiment the gradient is an indication of a change in the surface geometry of a surface producing an electric field. For example, if a surface is producing an electric field, that electric field may cause one or more properties of graphene to change. If, in addition, a portion of the surface producing an electric field is closer to the graphene, the electric field from that portion will be stronger, thus causing a greater change in the property of graphene. Thus, the gradient may be representative of the geometry of a surface. One, having skill in the art, will realize that this may be used to create a tomographic image of a surface. In a way, microscopy of surfaces may be created by either rotating graphene or rotating the surfaces, measuring the gradients associated with a surface and reconstructing them into images.

Figure 9A:
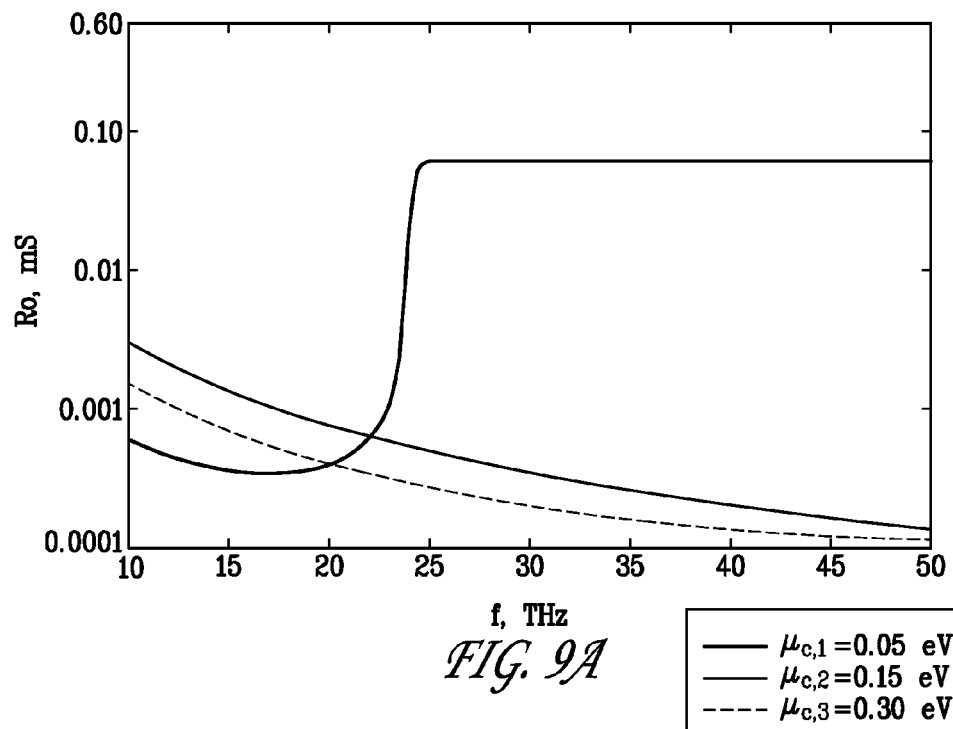
FIGS. 9(a)-(b) depict sample graphical results for the real and imaginary parts of sigma for graphene.
Figure 9B:
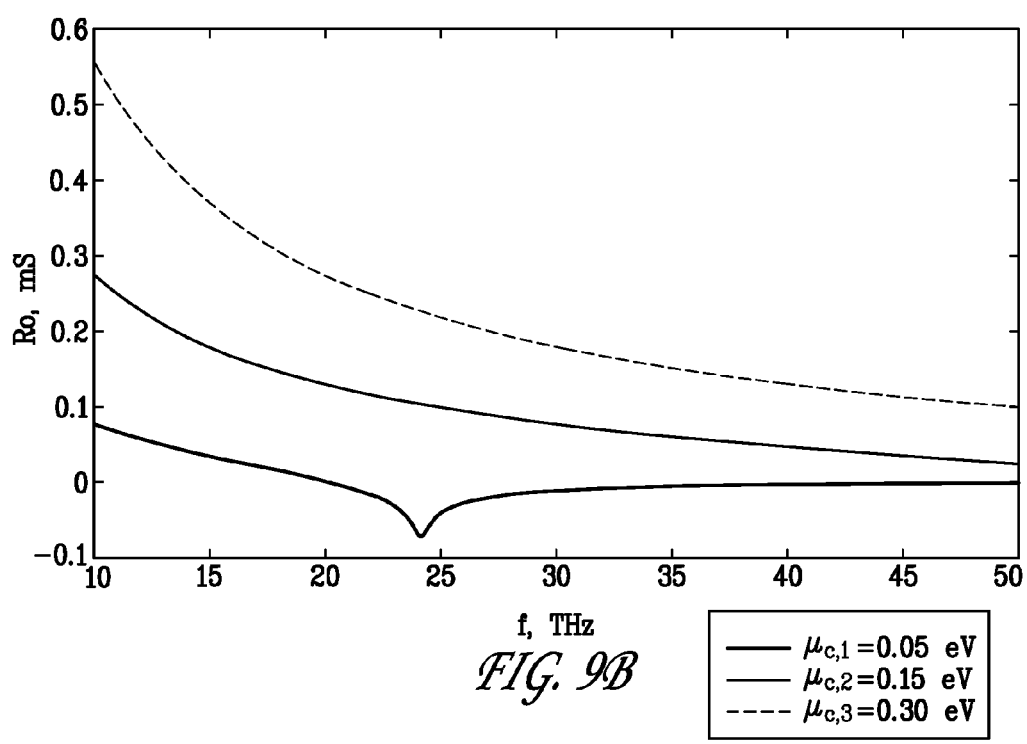

FIGS. 9(*a*)-(*b*) depict sample graphical results for the real and imaginary parts of sigma for graphene. FIG. 9(*a*) depicts sample graphical results for the real part of sigma and FIG. 9(*b*) depicts sample graphical results for the imaginary parts of sigma. These values may be related to the conductivity and permittivity of graphene.

FIG. 10 depicts an example of a way to provide a layer of graphene with two or more regions of conductivity. As depicted in FIG. 10, the graphene may be associated with a layer of material that has an electrical charge (a charged layer). The layer of material with the electrical charge may have associated therewith, a topology. This topology may mean that portions of the charged material are physically closer or further away from the graphene. As such, the graphene may receive a portion of the electric field from the charged material that is commensurate with the distance of the charged material from the graphene. For example, a portion of the graphene that is closer to the charged layer may receive a stronger electric field. A portion that is further away may receive a weaker field. This topology may be in any form to create regions of changed conductivity in a layer of graphene. These regions may be implemented as a waveguide, a ribbon, a splitter, a combiner, a concave or convex lens, a Luneburg lens, a mirror, a scatterer, an attenuator, Fourier optics, one or more gradients leading to metamaterial effects or any other optical system known in the art. The variously described optics may be implemented in a ribbon waveguide or along an interface waveguide of graphene, or along the sheet of graphene.

In another embodiment of providing different regions of conductivity to graphene, a charged layer may be placed near a layer of graphene, but one or more intermediate layers acting as a buffer or an insulator may be placed in between the graphene and the charged layer.

FIG. 11 depicts another way of altering the conductivity of a layer of graphene. In an embodiment, a single layer of material having a charge may be associated with a layer of graphene. There may be one or more layers of material in between the charged layer and the graphene. By varying the type of material between the charged layer and the graphene, the portion of an electrical field received by the graphene may be altered. As such, different regions of conductivity may be implemented on the layer of graphene. These portions may be used to create any of the optical signal manipulating elements noted above.

The methods, devices, systems and the like disclosed herein may also be used a general basis for the construction and implementation of metamaterials. The properties of graphene noted above that may be changed may act as the basis and a building blocks for one or more metamaterials or any metamaterial application or device.

Figure 12A:
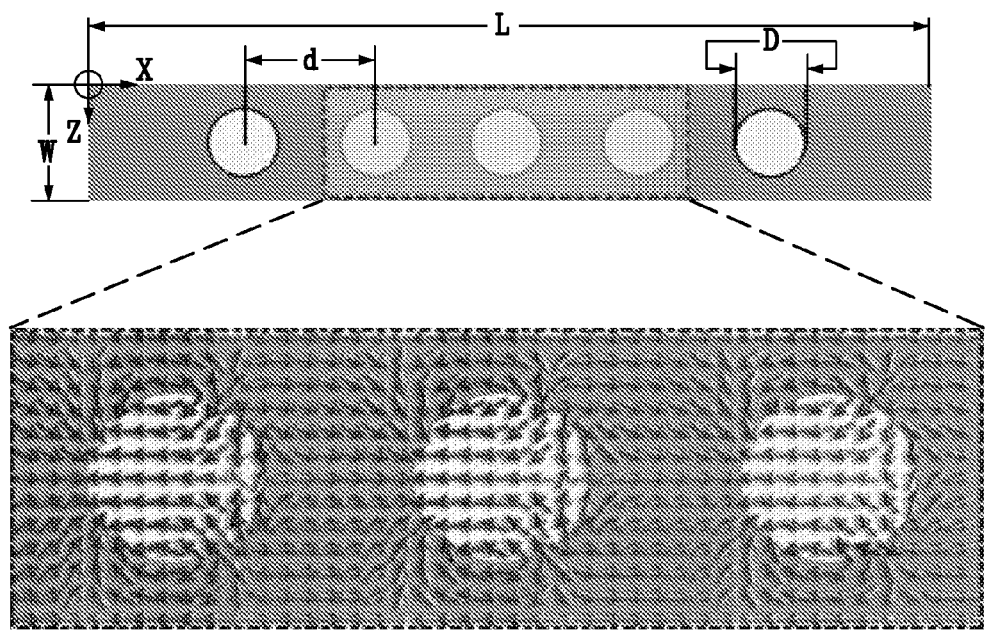
FIG. 12 depicts a ribbon like waveguide used to manipulate an optical signal with gradient conductivities, thereby creating a metamaterial.
Figure 12A:

As depicted in FIG. 12, there may be a layer of graphene having a waveguide implemented on it. Although a ribbon is depicted, the following is also true for interface waveguides. In addition, a sheet of graphene that has a propagating wave couple to it may act as a metamaterial. The layer of graphene, the sheet of graphene, or the ribbon portion or the interface may have one or more regions of varied or altered conductivity in the waveguide. As an example, these may exist as inhomogeneities in the conductivity that are smaller than the wavelength of a wave propagating on the waveguide. An optical signal on the graphene may interact with the regions of altered conductivity. This altered conductivity may be varied to create metamaterial effects. As one example, the effective index of refraction of the graphene may be varied to create an effective index of refraction that is less than 1, or even negative. Any other metamaterial effect known in the art may also be implemented by varying the size, shape, number, and conductivity of portions of graphene in a waveguided area. Altering the conductivity can tune the metamaterial.

Figure 12B:
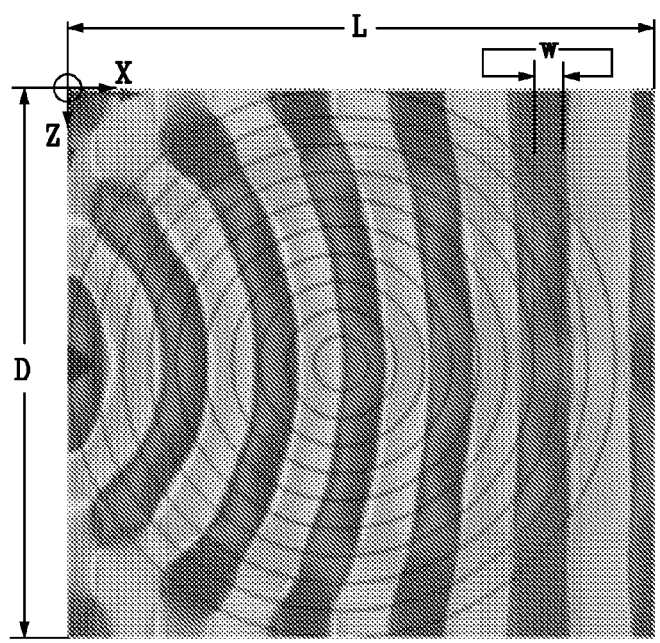

In one embodiment, gradient portions of conductivity may be implemented as a series of circles in a ribbon waveguide in graphene. Such an embodiment is depicted in FIGS. 12(a) and 12(b). As another example, these regions may be square, triangular, elliptical, arbitrary, rectangular or of any other shape. These regions of altered conductivity may be configured as bell curves in the conductivity, as step functions, stair functions, slopes, curved slopes or any other type of gradient. The altered portions may be of any number and they may be selected to manipulate optical signals. As such metamaterials may be created. Further, Fourier optics and manipulation of optical signals in Fourier space may be seen.

Optical signals may be coupled to graphene in any manner known in the art. As a first example, coupling may be performed by inserting a defect on the surface of the graphene and impinging upon the defect with an optical signal. In another embodiment, change in the conductivity of graphene may be used as defect on the surface to couple the impinging optical signal to the guided signal along the graphene. In another embodiment, prism coupling may be used. As a third example, evanescent wave pick off may be used. Any other method known in the art for coupling electromagnetic radiation to graphene may be used.

In another embodiment, nanoelectronics can be with nanophotonics using graphene, where the nanoelectronics may be handled by the metallic plates, rods, and surfaces in the vicinity of graphene, and the nanophotonics may be handled by the graphene. For example, nanoelectronic may influence nanophotonics based on proximity, or, in another embodiment, nanophotonics can influence nanoelectronics. As such, systems may be built in parallel or series to combine the two.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Additionally, the subject matter of the present disclosure includes combinations and subcombinations of the various processes, systems and configurations, and other features, functions, acts, and/or properties disclosed herein, as well as equivalents thereof.

Possible Theory.

Although not bound by the following, one possible theory associated with the above systems, methods and devices is described herein. In graphene there are regions of frequency (and different values of chemical potential or bias electric field) where $\sigma_{g,i}<0$, while in other ranges $\sigma_{g,i}>0$. What is the significance of $\sigma_{g,i}$ positive or negative values? To address this issue, even though the graphene may be a one-atom-thick layer of carbons, one model momentarily assumes that this layer has a very small thickness $\Delta$. Other models let $\Delta \to 0$. Thus volume conductivity may be defined for $\Delta$-thick graphene layer as $$\sigma_{g,v} \equiv \frac{\sigma_g}{\Delta},$$

and therefore the volume current density in this layer can be written as $J=\sigma_{g,v}E$. For the time harmonic variation $\exp(-i\omega t)$, the Maxwell equation $\nabla \times H = J - i\omega\varepsilon_o E$ in the $\Delta$-thick graphene layer can be recast as $\nabla \times H = (\sigma_{g,v} - i\omega\varepsilon_o)E$. If the complex equivalent permittivity of this $\Delta$-thick graphene layer is denoted as $\varepsilon_{g,eq}$, we can rewrite $\nabla \times H = -i\omega\varepsilon_{g,eq}E$, which leads to the following equality:

$$\varepsilon_{g,eq} \equiv -\frac{\sigma_{g,i}}{\omega\Delta} + \varepsilon_o + i\frac{\sigma_{g,r}}{\omega\Delta}.$$

This implies that an equivalent complex permittivity can be associated with a $\Delta$-thick graphene layer. This approach comprises treating the graphene layer as a thin layer of a bulk material with $\varepsilon_{g,eq}$, and then at the end, $\Delta \to 0$, thus recovering the one-atom thick layer geometry.) Specifically, note that $$\mathrm{Re}(\varepsilon_{g,eq}) \equiv -\frac{\sigma_{g,i}}{\omega\Delta} + \varepsilon_o \square - \frac{\sigma_{g,i}}{\omega\Delta}$$

for very small $\Delta$, and $$\mathrm{Im}(\varepsilon_{g,eq}) \equiv \frac{\sigma_{g,r}}{\omega\Delta}.$$

This shows that the real part of equivalent permittivity for this Δ-thick graphene layer can be positive or negative depending on the sign of the imaginary part of the graphene conductivity. Since $\sigma_{g,i}$ be positive or negative, in certain ranges of frequency and for certain $E_{bias}$ (or certain chemical potential) the graphene layer can therefore have an equivalent permittivity with negative real part. This mean that such a Δ-thick graphene layer may act as an effective Δ-thick "metal" layer when an optical signal interacts with it. It is known that a slab of a material with complex permittivity $\varepsilon_m$ with negative real part (e.g., Ag or Au) and with thickness Δ, surrounded by free space can support an odd transverse-magnetic (TM) electromagnetic guided mode with wave number β that can be expressed as $$\coth\left(\sqrt{\beta^2 - \omega^2\mu_o\varepsilon_m}\,\Delta/2\right) = -\frac{\varepsilon_m}{\varepsilon_o}\frac{\sqrt{\beta^2 - \omega^2\mu_o\varepsilon_0}}{\sqrt{\beta^2 - \omega^2\mu_o\varepsilon_m}}$$

Substituting $\varepsilon_m$ with the equivalent permittivity of the Δ-thick graphene layer discussed above, and then letting Δ→0, $$\beta^2 = \omega^2\mu_o\varepsilon_o\left[1 - \left(\frac{2\sqrt{\varepsilon_o}}{\sqrt{\mu_o}\,\sigma_g}\right)^2\right],$$

which is the expression for the wave number of the TM surface-plasmonic polariton (SPP) optical surface wave along a graphene layer. Therefore, when $\sigma_{g,i}>0$ (i.e., when $\text{Re}(\varepsilon_{g,eq})<0$), a single free-standing layer of graphene does behave as a very thin metal layer, supporting an electromagnetic TM SPP surface wave. However, when $\sigma_{g,i}<0$ (i.e., when $\text{Re}(\varepsilon_{g,eq})>0$), TM guided surface wave may no longer be supported on the graphene, and instead a weakly guided transverse-electric (TE) surface wave may be present.

When comparing the graphene with the thin metal layer, the graphene may offer at least three major advantages over a thin layer of conventional noble metals such as Ag or Au: (1) The material loss in graphene can be much lower than in silver or gold. This may lead to longer propagation length for the SPP wave along the graphene, as compared with the corresponding SPP along a silver-air interface; (2) The wave number β of the TM SPP wave along the graphene may be much larger than the free space wave number $k_o = \omega\sqrt{\mu_o\varepsilon_o}$, and as a result, such SPP optical waves are very tightly confined to the graphene layer, with guided wavelength $\lambda_{SPP}$ much shorter than its free space wavelength $\lambda_o$, i.e., $\lambda_{SPP} \ll \lambda_o$. (3) one of the advantages of graphene over thin metal layers is the ability to dynamically change the conductivity of graphene using the chemical doping or gate voltage, i.e., $E_{bias}$ in real time, locally and inhomogeneously. In other words, by using different values of $E_{bias}$ at different locations along the graphene layer, it may be possible make a desired pattern of conductivity distribution along the graphene layer. For example, at a given frequency for an optical signal, a proper choice of $E_{bias}$ can provide $\sigma_{g,i}>0$ or $\sigma_{g,i}<0$. Since the conductivity can be directly related to the equivalent permittivity for the Δ-thick graphene layer described above, the $E_{bias}$-dependent conductivity variation results in variation of equivalent permittivity, providing an exciting potential for tailoring and manipulating optical SPP waves along the graphene layer.

Therefore the graphene can be considered as a single-atomic-thin platform for manipulation of optical signals guided along the layer with desired 2D patterns of conductivity distributions, providing a "flatland" paradigm for optical metamaterials on this single-atomic layer. As noted above, the proper choice of spatial variation of conductivity distributions along the graphene provides possibility for tailing and manipulating optical guided signal paths on this graphene, and act as a basis for metamaterials.

What is claimed:

1. A layered device for guiding an optical signal on graphene, said device comprising:
   a charged plate electric field source layer;
   a layer of graphene, the layer of graphene at least partially overlapping with the charged plate electric field source layer,
   the charged plate electric field source layer being capable of electronic communication with the layer of graphene during device operation;
   a first portion of the layer of graphene being disposed at a first distance from the electric field source layer, and the first portion of the layer of graphene having associated therewith a first conductivity; and
   a second portion of the layer of graphene being disposed at a second distance from the electric field source layer, and the second portion of the layer of graphene having associated therewith a second conductivity,
   the first and second distances differing from one another, and
   at least one of the first and second conductivities being effected by application of an electric field from the charged plate electric field source layer.

2. The device of claim 1, further comprising a third portion of graphene having associated therewith, a third conductivity, wherein said third portion is bounded on one side by the first portion of graphene and on the other side by the second portion of graphene.

3. The device of claim 1, further comprising a third portion of graphene having associated therewith, a third conductivity, wherein the first portion and second portion have between them, a first interface, the first interface configured to guide an optical signal; and an intersection between the first interface and the third portion, wherein the third portion is configured to reflect the optical signal.

4. The device of claim 1, further comprising a third portion of graphene having associated therewith, a third conductivity, wherein the first portion and second portion have between them, a first interface, the first interface configured to guide an optical signal and an intersection between the first interface and the third portion, wherein the third portion is configured to scatter the optical signal.

5. The device of claim 1, further comprising a third portion of graphene having associated therewith, a third conductivity, wherein the first portion and second portion have between them, a first interface, the first interface configured to guide an optical signal and an intersection between the first interface and the third portion, wherein the third portion is configured to attenuate the optical signal.

6. The device of claim 1, further comprising a third portion of graphene having associated therewith, a third conductivity, wherein the first portion and second portion have between them, a first interface; the first interface configured to guide an optical signal and an intersection between the first interface and the third portion, wherein the third portion is configured to refract the optical signal.

7. The device of claim 1, further comprising a third portion of the layer of graphene having associated therewith, a third conductivity, wherein said second portion is bounded on a first side by the first portion and wherein the second portion is bounded on a second side by the third portion, and wherein said second portion comprises an optical signal waveguide; a fourth portion of graphene having associated therewith, a fourth conductivity; and an intersection between the second portion and the fourth portion, wherein the fourth portion is configured to reflect the optical signal.

8. The device of claim 1, further comprising a third portion of the layer of graphene having associated therewith, a third conductivity, wherein said second portion is bounded on a first side by the first portion and wherein the second portion is bounded on a second side by the third portion, and wherein said second portion comprises an optical signal waveguide; a fourth portion of graphene having associated therewith, a fourth conductivity; and an intersection between the second portion and the fourth portion, wherein the fourth portion is configured to scatter the optical signal.

9. The device of claim 1, further comprising a third portion of the layer of graphene having associated therewith, a third conductivity, wherein said second portion is bounded on a first side by the first portion and wherein the second portion is bounded on a second side by the third portion, and wherein said second portion comprises an optical signal waveguide; a fourth portion of graphene having associated therewith, a fourth conductivity; and an intersection between the second portion and the fourth portion, wherein the fourth portion is configured to attenuate the optical signal.

10. The device of claim 1, further comprising a third portion of the layer of graphene having associated therewith, a third conductivity, wherein said second portion is bounded on a first side by the first portion and wherein the second portion is bounded on a second side by the third portion, and wherein said second portion comprises an optical signal waveguide; a fourth portion of graphene having associated therewith, a fourth conductivity; and an intersection between the second portion and the fourth portion, wherein the fourth portion is configured to refract the optical signal.

11. The device of claim 1, further comprising a third portion of the layer of graphene having associated therewith, a third conductivity, wherein said second portion is bounded on a first side by the first portion and wherein the second portion is bounded on a second side by the third portion, and wherein said second portion comprises an optical signal waveguide; a fourth portion of graphene having associated therewith, a fourth conductivity; and an intersection between the second portion and the fourth portion, wherein the fourth portion is configured to alter the effective index of refraction of the layer of graphene.

12. The device of claim 11, further comprising a fifth portion of graphene having associated therewith, a fifth conductivity, an intersection between the fifth portion of graphene and the second portion of graphene; wherein the fifth portion is configured to alter the effective index of refraction of the layer of graphene.

13. The device of claim 1, further comprising a third portion of the layer of graphene having associated therewith, a third conductivity, wherein said second portion is bounded on a first side by the first portion and wherein the second portion is bounded on a second side by the third portion, and wherein said second portion comprises an optical signal waveguide; a fourth portion of graphene having associated therewith, a fourth conductivity; and an intersection between the second portion and the fourth portion, wherein the fourth portion is configured as a Fourier optic.

14. The device of claim 1, further comprising a third portion of the layer of graphene having associated therewith, a third conductivity, wherein said second portion is bounded on a first side by the first portion and wherein the second portion is bounded on a second side by the third portion, and wherein said second portion comprises an optical signal waveguide; a fourth portion of graphene having associated therewith, a fourth conductivity; and an intersection between the second portion and the fourth portion, wherein the fourth portion is configured as a Luneburg lens.

15. A device, comprising:
a first portion of graphene having at least one interface with a second portion of graphene;
the first portion of graphene having associated therewith a first conductivity and the second portion of graphene having associated therewith a second conductivity, and
the at least one interface being curved.

16. The device of claim 15, wherein the interface is configured as an inhomogeneity in conductivity, as a Luneburg lens, as a Fourier Optic, as a metamaterial, as a lens, as a mirror, as a scatterer, as an attenuator, or as a beam splitter.

17. The device of claim 15, further comprising a charged plate electric field source within about 1 cm of the first portion of graphene, the second portion of graphene, or both.

18. The device of claim 15, wherein the interface between the first portion of graphene and the second portion of graphene is configured as a waveguide.

19. The device of claim 18, wherein at least one inhomogeneity is present along the waveguide.

20. The device of claim 15, further comprising a third portion of graphene having associated therewith, a third conductivity.

21. The device of claim 20, wherein said second portion is bounded on a first side by the first portion and wherein the second portion is bounded on a second side by the third portion, and wherein said second portion comprises an optical signal waveguide.

22. The device of claim 21, wherein at least one inhomogeneity is present along the optical signal waveguide.

23. The device of claim 21, wherein at least one inhomogeneity is configured as an inhomogeneity in conductivity, as a Luneburg lens, as a Fourier Optic, as a metamaterial, as a lens, as a mirror, as a scatterer, as an attenuator, or as a beam splitter.

24. The device of claim 15, wherein the at least one interface comprises an angle.

25. The device of claim 1, wherein the charged plate electric field source is located within about 1 cm from the layer of graphene.

26. A layered device for guiding an optical signal on graphene, said layered device comprising:
a layer of graphene; and
an electric field source substrate, the layer of graphene and the electric field source substrate at least partially overlapping,
the electric field source substrate being capable of electronic communication with the layer of graphene during device operation,
the electric field source substrate being capable of applying a voltage across the layer of graphene during device operation,
a first portion of the layer of graphene overlaying a region of the electric field source layer, the first portion of the layer of graphene having associated therewith a first conductivity during device operation; and a second portion of the layer of graphene overlaying a region of the electric field source layer, the second portion of the layer of graphene having associated therewith a second conductivity during device operation, the first and second conductivities being different from one another, a material being disposed between the second portion of the layer of graphene and the electric field source layer so as to give rise to the second conductivity of the second portion of the layer of graphene during device operation, and at least one of the first and second conductivities being effected by application of an electric field from the electric field source substrate.

* * * * *